US012692840B1

(12) United States Patent
Greeves et al.

(10) Patent No.: US 12,692,840 B1
(45) Date of Patent: Jul. 28, 2026

(54) CATAMARAN FLOATING OFFSHORE WIND TURBINE TRANSPORTATION AND INSTALLATION VESSEL

(71) Applicants: E. John Greeves, Houston, TX (US); Philip S. Rundle, Houston, TX (US); Ian R. Todd, Houston, TX (US); Jason C. Fabre, Houston, TX (US)

(72) Inventors: E. John Greeves, Houston, TX (US); Philip S. Rundle, Houston, TX (US); Ian R. Todd, Houston, TX (US); Jason C. Fabre, Houston, TX (US)

( * ) Notice: Subject to any disclaimer, the term of this patent is extended or adjusted under 35 U.S.C. 154(b) by 55 days.

(21) Appl. No.: 18/631,781

(22) Filed: Apr. 10, 2024

Related U.S. Application Data

(60) Provisional application No. 63/495,291, filed on Apr. 10, 2023.

(51) Int. Cl.
| | |
|---|---|
| *E02D 17/00* | (2006.01) |
| *B66C 23/52* | (2006.01) |
(Continued)

(52) U.S. Cl.
CPC ............ *F03D 13/256* (2023.08); *B66C 23/52* (2013.01); *E02B 17/00* (2013.01); *F03D 13/126* (2023.08);
(Continued)

(58) Field of Classification Search
CPC ...... F03D 13/25; F03D 13/126; F03D 13/256; E02B 2017/0043; E02B 2017/0047; E02B 2017/0091
See application file for complete search history.

(56) References Cited

U.S. PATENT DOCUMENTS

| | | |
|---|---|---|
| 7,220,104 B2 | 5/2007 | Zheng et al. |
| 7,527,006 B2 | 5/2009 | Khachaturian |
(Continued)

FOREIGN PATENT DOCUMENTS

| | | |
|---|---|---|
| CN | 103758705 | 4/2014 |
| EP | 1269018 | 1/2003 |
(Continued)

OTHER PUBLICATIONS

PCT International Search Report and the Written Opinion of the International Searching Authority, PCT/US2023/012733, Dated Jun. 12, 2023.

*Primary Examiner* — Benjamin F Fiorello
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT
A method and apparatus for installing a wind turbine in a marine environment includes the steps of transporting the wind turbine from a first location to a second location with a floating installation vessel having two spaced apart hulls with a gap between the hulls and positioning the wind turbine in the gap between the hulls. There are spaced apart bow and stem gantries spanning from one hull to the other hull, wherein the gantries include a bow gantry and a stem gantry. The method includes holding the lower end portion of the wind turbine column with a turbine support mechanism that includes a frame or plate having an open ended recess that is occupied by the turbine column lower end. The mechanism selectively raises or lowers the plate with hydraulic rams that each connect to the table and to the bow gantry, thus enabling aligning the turbine column lower end with the foundation. A connection of the turbine column to the foundation can be welded, bolted or grouted.

22 Claims, 14 Drawing Sheets

(51) Int. Cl.
    *E02B 17/00*     (2006.01)
    *F03D 13/10*     (2016.01)
    *F03D 13/25*     (2016.01)

(52) U.S. Cl.
    CPC .... *F03D 13/139* (2023.08); *E02B 2017/0043*
    (2013.01); *E02B 2017/0047* (2013.01); *E02B*
    *2017/0091* (2013.01); *F05B 2230/6102*
    (2013.01); *F05B 2240/932* (2013.01); *F05B*
    *2240/95* (2013.01)

(56)           References Cited

U.S. PATENT DOCUMENTS

| | | | |
|---|---|---|---|
| 7,845,296 | B1 | 12/2010 | Khachaturian |
| 7,886,676 | B2 | 2/2011 | Khachaturian |
| 8,061,289 | B2 | 11/2011 | Khachaturian |
| 8,123,484 | B2 | 2/2012 | Choi et al. |
| 8,240,264 | B2 | 8/2012 | Khachaturian |
| 8,683,872 | B1 | 4/2014 | Khachaturian et al. |
| 8,701,579 | B2 * | 4/2014 | Roodenburg .......... B63B 1/107 |
| | | | 405/209 |
| 8,740,543 | B2 | 6/2014 | Weaver |
| 8,820,254 | B2 | 9/2014 | Tosello |
| 8,960,114 | B2 | 2/2015 | Khachaturian |
| 9,022,691 | B2 * | 5/2015 | Westergaard .......... B63B 77/10 |
| | | | 405/204 |
| 9,527,560 | B2 | 12/2016 | Khachaturian |
| 9,604,710 | B2 | 3/2017 | Khachaturian |
| 9,701,376 | B2 | 7/2017 | Khachaturian |
| 9,926,042 | B2 | 3/2018 | Khachaturian |
| 10,161,387 | B2 | 12/2018 | Frydendal |
| 10,173,758 | B2 | 1/2019 | Khachaturian |
| 10,184,587 | B1 | 1/2019 | Khachaturian |
| 10,279,872 | B2 | 5/2019 | Khachaturian |
| 10,286,985 | B2 | 5/2019 | Khachaturian |
| 10,308,328 | B2 | 6/2019 | Siegfriedsen |
| 10,486,779 | B2 | 11/2019 | Khachaturian |
| 10,543,890 | B2 | 1/2020 | Khachaturian |
| 10,800,498 | B2 | 10/2020 | Khachaturian |
| 10,960,959 | B2 | 3/2021 | Khachaturian |
| 11,034,416 | B2 | 6/2021 | Khachaturian |
| 11,034,417 | B2 | 6/2021 | Khachaturuian |
| 11,345,452 | B2 | 5/2022 | Khachaturian |
| 11,353,006 | B2 | 6/2022 | Munk-Hansen |
| 11,383,799 | B2 | 7/2022 | Colmard et al. |
| 11,384,736 | B1 | 7/2022 | Piasecki et al. |
| 2005/0286979 | A1 * | 12/2005 | Watchorn ............... E02B 17/00 |
| | | | 405/203 |
| 2009/0191002 | A1 * | 7/2009 | Stubler ................. E02B 17/027 |
| | | | 405/209 |
| 2011/0126748 | A1 * | 6/2011 | Wu ......................... F03D 13/40 |
| | | | 254/133 R |
| 2011/0139056 | A1 * | 6/2011 | Cholley ................. F03D 13/10 |
| | | | 405/209 |
| 2012/0001431 | A1 * | 1/2012 | Smith ................. E02B 17/0004 |
| | | | 290/53 |
| 2012/0073485 | A1 | 3/2012 | Khachaturian |
| 2012/0103244 | A1 | 5/2012 | Gong et al. |
| 2012/0255478 | A1 | 10/2012 | Hadeler et al. |
| 2013/0019792 | A1 | 1/2013 | Jahnig et al. |
| 2013/0051924 | A1 * | 2/2013 | Willis .................... F03D 13/10 |
| | | | 414/803 |
| 2013/0233231 | A1 | 9/2013 | Dagher et al. |
| 2017/0120993 | A1 * | 5/2017 | Amate López ......... F03D 13/25 |
| 2019/0071830 | A1 * | 3/2019 | Lindblade ............. E02B 17/024 |
| 2021/0123203 | A1 * | 4/2021 | Rabaut ...................... E02D 7/00 |
| 2022/0081072 | A1 | 3/2022 | Bonnaffoux et al. |
| 2022/0128034 | A1 | 4/2022 | Krogenes et al. |
| 2022/0234697 | A1 | 7/2022 | Hjelmstad et al. |

FOREIGN PATENT DOCUMENTS

| | | |
|---|---|---|
| JP | 2001509565 | 7/2001 |
| WO | WO200134977 | 5/2001 |
| WO | WO2021191766 | 9/2021 |
| WO | WO2022086329 | 4/2022 |

* cited by examiner

CATAMARAN FLOATING OFFSHORE WIND TURBINE TRANSPORTATION AND INSTALLATION VESSEL

CROSS-REFERENCE TO RELATED APPLICATIONS

This application claims the benefit of U.S. Provisional Patent Application Ser. No. 63/495,291, filed 10 Apr. 2023, which is incorporated herein by reference. Priority of U.S. Provisional Patent Application Ser. No. 63/495,291, filed 10 Apr. 2023 is hereby claimed.

STATEMENT REGARDING FEDERALLY SPONSORED RESEARCH OR DEVELOPMENT

Not applicable

BACKGROUND OF THE INVENTION

1. Field of the Invention

The present invention relates to an improved catamaran supported wind turbine apparatus and method of installation that features a specially configured gripping apparatus that supports a wind turbine (e.g., a fully assembled wind turbine) to enable placement on a suitable wind turbine foundation.

2. General Background of the Invention

Wind turbines are deployed offshore for the generation of electrical power. Wind flows offshore can provide more efficient power generation due to lack of interference of the wind flows by topography and structures.

Wind turbines located offshore must be supported by a foundation. The foundation can be attached directly to the seabed (a fixed foundation) or can be a floating structure which in turn is moored to the seabed through a combination of mooring or connecting lines.

Wind turbines are manufactured on a worldwide basis and shipped to deployment regions in multiple components (i.e., blades, hub/nacelle/gearbox, supporting tower sections). The turbines must be assembled and positioned onto the offshore foundation. Turbines are currently transported and assembled piecemeal offshore onto the foundation using either floating crane vessels or cranes located on jack-up vessels which are supported on legs connecting to the seabed.

Installation of wind turbine components by floating crane vessels requires the accommodation of relative motions arising between the component and the foundation due to the marine environment. This may in turn result in considerable downtime (commercial inefficiency) when installation operations are not possible.

Wind turbines can be placed in a marine environment such as in offshore wind farms (e.g., Hornsea One, United Kingdom and Clyde Wind Farm, United Kingdom). In the USA, wind turbines are operational off the East Coast (e.g., Block Island Wind Farm). Manufacturers of wind turbines include GE, Vestos, and Siemens as examples. U.S. Pat. Nos. 7,220,104; 8,123,484; 10,161,387; and 11,353,006 disclose wind turbines. U.S. Pat. Nos. 7,220,104; 8,123,484; 10,161,387; and 11,353,006 are each hereby incorporated herein by reference.

U.S. Provisional Patent Application Ser. No. 63/404,719, filed 8 Sep. 2022; U.S. Provisional Patent Application Ser.

No. 63/384,568, filed 21 Nov. 2022; U.S. patent application Ser. No. 18/166,961, filed 9 Feb. 2023; and PCT International Application No. PCT/US2023/012733, filed 9 Feb. 2023, are each hereby incorporated herein by reference.

The following possibly relevant U.S. Patents and Publications are incorporated herein by reference:

TABLE 1

| Patent/ Publication No. | Title | Issued MM/DD/ YYYY |
|---|---|---|
| 8,740,543 | OFFSHORE WIND TURBINES AND DEPLOYMENT METHOS THEREFOR | Jun. 3, 2014 |
| 8,820,254 | CATAMARAN SHIP USED FOR ASSEMBLING, TRANSPORTING AND INSTALLING A MARINE WIND TURBINE ON THE SEAFLOOR | Sep. 2, 2014 |
| 10,308,328 | FLOATING WIND TURBINE WITH A FLOATING FOUNDATION, AND METHOD FOR INSTALLATION OF SUCH A WIND TURBINE | Jun. 4, 2019 |
| 11,383,799 | FLOATING SUPPORT STRUCTURE FOR OFFSHORE WIND TURBINE AND METHOD FOR INSTALLING A WIND TURBINE PROVIDED WITH SUCH A SUPPORT STRUCTURE | Jul. 12, 2022 |
| 11,384,736 | FLOATING OFFSHORE WIND TURBINE SYSTEM, APPARATUS AND METHOD | Jul. 12, 2022 |
| 2012/0103244 | TRUSS CABLE SEMI-SUBMERSIBLE FLOATER FOR OFFSHORE WIND TURBINES AND CONSTRUCTION METHODS | May 3, 2012 |
| 2012/0255478 | SHIP AND METHOD FOR CONVEYING AND SETTING UP OFFSHORE STRUCTURES INPUT-OUTPUT CIRCUIT | Oct. 11, 2012 |
| 2013/0019792 | FLOATING FOUNDATION FOR MASS PRODUCTION | Jan. 24, 2013 |
| 2013/0233231 | FLOATING WIND TURBINE PLATFORM AND METHOD OF ASSEMBLING | Sep. 12, 2013 |
| 2022/0081072 | FLOATING WIND TURBINE SUPPORT | Mar. 17, 2022 |
| 2022/0128034 | FLOATING WINDMILL INSTALLATION | Apr. 28, 2022 |
| 2022/0234697 | A FLOATING STRUCTURE AND METHOD OF INSTALLATION | Jul. 28, 2022 |
| WO200134977A1 | METHOD AND SYSTEM FOR INSTALLING AND TRANSPORTING AN OFFSHORE WIND POWER STATION AT SEA | May 17, 2001 |
| EP1269018A1 | FLOATING OFFSHORE WIND POWER INSTALLATION | Jan. 2, 2003 |

Patents have issued for catamaran lifting apparatus and catamaran personnel quarters as well as oil production structures. The following Table 2 lists examples of such patents. Patents listed in Table 2 are each hereby incorporated herein by reference.

TABLE 2

| Pat. No. | Title | Issued MM/DD/ YYYY |
|---|---|---|
| 7,527,006 | MARINE LIFTING APPARATUS | May 5, 2009 |
| 7,845,296 | MARINE LIFTING APPARATUS | Dec. 7, 2010 |

TABLE 2-continued

| Pat. No. | Title | Issued MM/DD/ YYYY |
|---|---|---|
| 7,886,676 | MARINE LIFTING APPARATUS | Feb. 15, 2011 |
| 8,061,289 | MARINE LIFTING APPARATUS | Nov. 22, 2011 |
| 8,240,264 | MARINE LIFTING APPARATUS | Aug. 14, 2012 |
| 8,683,872 | TEST WEIGHT | Apr. 1, 2014 |
| 8,960,114 | MARINE LIFTING APPARATUS | Feb. 24, 2015 |
| 9,527,560 | MARINE LIFTING APPARATUS | Dec. 27, 2016 |
| 9,604,710 | MARINE LIFTING APPARATUS | Mar. 28, 2017 |
| 9,701,376 | MARINE LIFTING APPARATUS | Jul. 11, 2017 |
| 9,926,042 | MARINE LIFTING APPARATUS | Mar. 27, 2018 |
| 10,173,758 | MARINE LIFTING APPARATUS | Jan. 8, 2019 |
| 10,184,587 | UNDERWATER PIPE LIFTING AND CUTTING APPARTUS AND METHOS | Jan. 22, 2019 |
| 10,279,872 | FLOATING CATAMARAN PRODUCTION PLATFORM | May 7, 2019 |
| 10,286,985 | MARINE LIFTING APPARATUS | May 14, 2019 |
| 10,486,779 | FLOATING CATAMARAN PRODUCTION PLATFORM | Nov. 26, 2019 |
| 10,543,890 | MARINE LIFTING APPARATUS | Jan. 28, 2020 |
| 10,800,498 | METHOD AND APPARATUS FOR SUPPORTING A PERSONNEL HOUSING IN A MARINE ENVIRONMENT | Oct. 13, 2020 |
| 10,960,959 | MARINE LIFTING APPARATUS | Mar. 30, 2021 |
| 11,034,416 | FLOATING CATAMARAN PRODUCTION PLATFORM | Jun. 15, 2021 |
| 11,034,417 | FLOATING CATAMARAN PRODUCTION PLATFORM | Jun. 15, 2021 |
| 11,345,452 | MARINE LIFTING APPARATUS | May 31, 2022 |

BRIEF SUMMARY OF THE INVENTION

The present invention is a catamaran floating offshore wind turbine transportation and installation vessel comprising of two hulls, two gantries (a bow gantry and a stem gantry) spanning the hulls, and a turbine support system attached to one of the gantries (e.g., bow gantry). The installation vessel supports the fully assembled turbine at the base of the turbine support tower using a gripping apparatus (e.g., an open gate type gripper) in turn connected to a support structure on the gantry such as a rigid table. The support structure or rigid table is in turn supported both vertically and horizontally by groups of motion compensated hydraulic rams (commercially available from NOV Inc. (https://www.nov.com/) and Oil States Industries, Inc. (https://oilstates.com/) companies).

For transportation from the turbine assembly site (land based) to the final installation location, the support table and rams are preferably connected (e.g., rigidly) to the bow gantry. At the installation location, the support table is unlocked and the motion compensated hydraulic rams are activated. The motion compensated rams are preferably driven with dynamic fluid hydraulic power meaning that they can extend and retract at speeds equal to the motions of the catamaran installation vessel in the marine environment.

A central motion response control system can be provided which monitors the motions of the installation vessel and the motions of the foundation structure (if it is floating), and then subsequently controls the flow of the dynamic fluid hydraulic power to the rams in such a way as to modify the motions of the turbine/gripper/tower relative to the installation vessel and eliminate or significantly reduce the relative motions between the wind turbine and foundation.

When these relative motions are considered to be acceptable the wind turbine is lowered onto the foundation using the vertically orientated hydraulic rams. Once the wind turbine is securely located onto the foundation, the gate type clamp apparatus is opened to disconnect the turbine from the installation vessel.

The proposed catamaran installation vessel performs in such a manner as to limit the wind turbine motions when supported by the vessel in the marine environment thereby limiting the amount of motion compensation required to achieve acceptable levels of relative motions between the turbine and the foundation. The motions performance of the catamaran vessel can be optimized for specific marine environments through selection of the hull dimensions (length and width) and the spacing of the hulls. The port and starboard hulls preferably do not need to be of the same dimensions.

Position keeping of the vessel and wind turbine offshore during the installation process can be by dynamic positioning or mooring to the seabed.

The wind turbine can range in size/capacity from about 1 MW to 50 MW.

The port hull can be of dimensions about 250 ft. to 500 ft. in length, about 50 ft. to 150 ft. in width, about 12 ft. to 30 ft. in depth.

The starboard hull can be for example of dimensions about 250 ft. to 500 ft. in length, about 50 ft. to 150 ft. in width, about 12 ft. to 30 ft. in depth.

The open gap between the port and starboard hulls can be for example of dimensions about 50 ft. to 200 ft.

The station keeping of the installation and turbine offshore can be by the use of a dynamic positioning system comprising of for example between 2 and 4 azimuthing thrusters located in each hull (port and starboard) and can be controlled by a station keeping monitoring and control system.

The station keeping of the installation and turbine offshore can be by the use of a spread mooring system anchored to the seabed and comprising of for example between 4 and 12 mooring lines made up of chain, wire rope, fiber rope or any combination of these. Each mooring line can have a temporary embedment anchor attached to one end. Each mooring line can pass through a mooring fairlead located on the hulls to a winch used to deploy and retrieve the mooring line(s) and position the vessel laterally as required.

The wind turbine can be assembled directly onto the installation vessel at a sheltered location such as a quay or dock. Assembly of the wind turbine may be by land based crawler crane, land based custom lifting device, floating crane vessel or a jack-up supported crane.

The installation vessel and turbine can be towed from the sheltered location to the offshore installation location by one or more (e.g., one, two or three or more) tugs.

The installation vessel and turbine can propel itself from the sheltered location to the offshore installation location (wind turbine foundation) by using a provided dynamic positioning system.

On location, the installation vessel will position itself such that the base of the wind turbine column is located generally vertically above the wind turbine foundation (see FIG. 16). The vertical clearance between the base of the wind turbine tower and the top of the foundation may be between about 3 ft. and 15 ft. The vertically oriented motion compensated rams can be operated by hydraulic fluid acting with a pressure of between about 1,000 psi and 10,000 psi. The horizontally oriented motion compensated rams can be operated by hydraulic fluid acting with a pressure of between about 1,000 psi and 10,000 psi. The vertically oriented motion compensated rams can have an axial push/pull capacity of between about 500 tons and 5,000 tons each. The horizontally oriented motion compensated rams can have an axial push/pull capacity of between about 500 tons and 5,000 tons each. The horizontally oriented motion compensated rams can have a push/pull stroke of between about 3 ft. and 30 ft. The vertically oriented motion compensated rams can have a push/pull stroke of between about 3 ft. and 40 ft. The vertically oriented motion compensated rams can extend and retract at a speed of between about 0.5 ft. per second and 5 ft. per second. The horizontally oriented motion compensated rams can extend and retract at a speed of between about 0.5 ft. per second and 5 ft. per second.

The motions of the turbine (heave, surge, sway, pitch, roll and yaw) relative to the foundation can be limited through the combined action of the actions (motions) of the vertical and horizontal motion compensating hydraulic rams. Pitch, roll and heave motions of the wind turbine can be controlled primarily by the vertically aligned rams. Surge and sway motions can be controlled primarily by the horizontally aligned rams.

A computer controller system can be used to control the performance of the motion compensating rams and can use Artificial Intelligence to optimize the reduction of the relative motions between the wind turbine and foundation.

The motions of the foundation can be measured by accelerometers positioned on the foundation and the measured responses transmitted to the computer controller system located on the installation vessel wirelessly.

The motions of the foundation can be measured by electromagnetic waves (either radio waves or light waves) transmitted from the installation vessel towards the foundation and reflected preferably either by the foundation itself or prismatic reflectors optimized for the nature of the electromagnetic wave used on the foundation.

The motions of the turbine supported by the installation vessel can be by accelerometers located on the support table and connected directly to a computer controller system by wires and/or cables.

A computer controller system can reduce the relative motions between the wind turbine and foundation by numerically calculating the difference between the measured foundation and wind turbine motions and instructing the motion compensating rams to move in such way or ways as to be equal to the differences in the measured motions.

A computer controller system can reduce the relative motions between the wind turbine and foundation by using a numerical prediction algorithm based on the short term actual motions performance of the foundation and the wind turbine thereby predicting the difference between the measured foundation and wind turbine motions and instructing the motion compensating rams to move in such way or ways as to be equal to the differences in the measured motions.

A computer controller system can reduce the relative motions between the wind turbine and foundation by monitoring the actual wave trains experienced during the installation process preferably using either a wave rider buoy or a wave radar and the actual motions performance of the foundation and wind turbine, and then using this data to predict the difference between the foundation and wind turbine motions and instructing the motion compensating rams to move in such way or ways as to be equal to the differences in the measured motions.

Once the relative motions between the base of the wind turbine and foundation are within acceptable limits the computer controller will cause the vertically oriented motion compensated rams to lower the wind turbine column onto the foundation completing the installation process. The wind turbine can be connected to the turbine foundation by welding, bolting, splice or other means.

The present invention includes a method of installing a wind turbine on a foundation in a marine environment. The wind turbine can be transported from a first location to a second location with a floating installation vessel preferably having two spaced apart hulls with a gap between the hulls, the turbine preferably having a column and a column lower end portion. The wind turbine is preferably positioned in the gap between the hulls. Spaced apart bow and stem gantries are preferably spanned from one hull to the other hull, the gantries including a bow gantry and a stem gantry. The lower end portion of the wind turbine column is preferably held with a turbine support mechanism that includes a plate preferably having an open ended recess that is occupied by the turbine column lower end portion. The plate can be selectively raised or lowered with hydraulic rams that each connect to the plate and to the bow gantry. The turbine column lower end portion can be aligned with the foundation. A connection can be formed of the turbine column to the foundation.

In one or more preferred embodiments, there can be trunnions on the turbine column and recesses on the plate that are preferably configured to connect with the trunnions.

In one or more preferred embodiments, the plate can have a curved portion that corresponds in shape to the outer surface of the turbine column.

In one or more preferred embodiments, the hydraulic rams preferably include laterally extending rams and inclined rams.

In one or more preferred embodiments, each said gantry can be a truss.

In one or more preferred embodiments, the first location can be in a dock, port or shipyard.

In one or more preferred embodiments, the wind turbine can be fully assembled at the first location.

In one or more preferred embodiments, the turbine can have blades and the plate is preferably positioned below the blades.

In one or more preferred embodiments, one or more of the hydraulic rams can be motion compensated hydraulic rams.

In one or more preferred embodiments, the rams preferably include rams that can be oriented generally horizontally or laterally extending.

In one or more preferred embodiments, the rams preferably include rams that can be oriented generally inclined or vertically extending.

In one or more preferred embodiments, each gantry can attach to one hull with a pinned connection.

In one or more preferred embodiments, the rams preferably include vertically oriented rams and laterally or horizontally oriented rams.

The present invention includes a wind turbine marine installation apparatus for installing a wind turbine on a foundation including a catamaran vessel having spaced apart hulls and a space between the hulls, a bow gantry that connects to each hull, a stem gantry that connects to each hull, a turbine support mechanism that can be removably connectable to the turbine at a turbine base or lower end portion, the mechanism including a table having an open ended recess that can be sized and shaped to receive the turbine base or lower end portion, one or more hydraulic lifting devices that preferably form an interface between the table and the bow gantry, and extension and retraction of said hydraulic lifting devices can enable selective positioning of the table relative to the foundation.

In one or more preferred embodiments, the hydraulic lifting devices can be hydraulic rams, each having a ram cylinder and an extendable/retractable pushrod.

In one or more preferred embodiments, the table can have three closed sides and one open side at the open ended recess.

In one or more preferred embodiments, each hydraulic lifting device preferably attaches to a table closed side.

In one or more preferred embodiments, each hull can have a bow and the bow gantry is so positioned that the foundation can occupy the space aft of each hull bow.

In one or more preferred embodiments, the foundation can have an upper edge and the upper edge is connectable with the wind turbine at a position in between the hulls and behind each hull bow.

The present invention includes a wind turbine marine installation apparatus for installing a wind turbine having a column and a base on a foundation, including a catamaran vessel preferably having spaced apart hulls and a space between said hulls, a bow gantry that can connect to each hull, a stem gantry that can connect to each hull, a turbine support mechanism that can be removably connectable to the turbine lower end portion, the mechanism including a frame preferably having an open ended recess that is sized and shaped to receive the turbine base or lower end portion, one or more hydraulic lifting devices that can form an interface between the frame and the bow gantry, and extension and retraction of the hydraulic lifting devices can enable selective positioning of the frame relative to the foundation.

In one or more preferred embodiments, the method further comprises compensation of relative motions between the foundation and the wind turbine.

In one or more preferred embodiments, the method further comprises reduction of relative motions between the foundation and the wind turbine.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote the like elements and wherein.

DETAILED DESCRIPTION OF THE INVENTION

Figure 1:
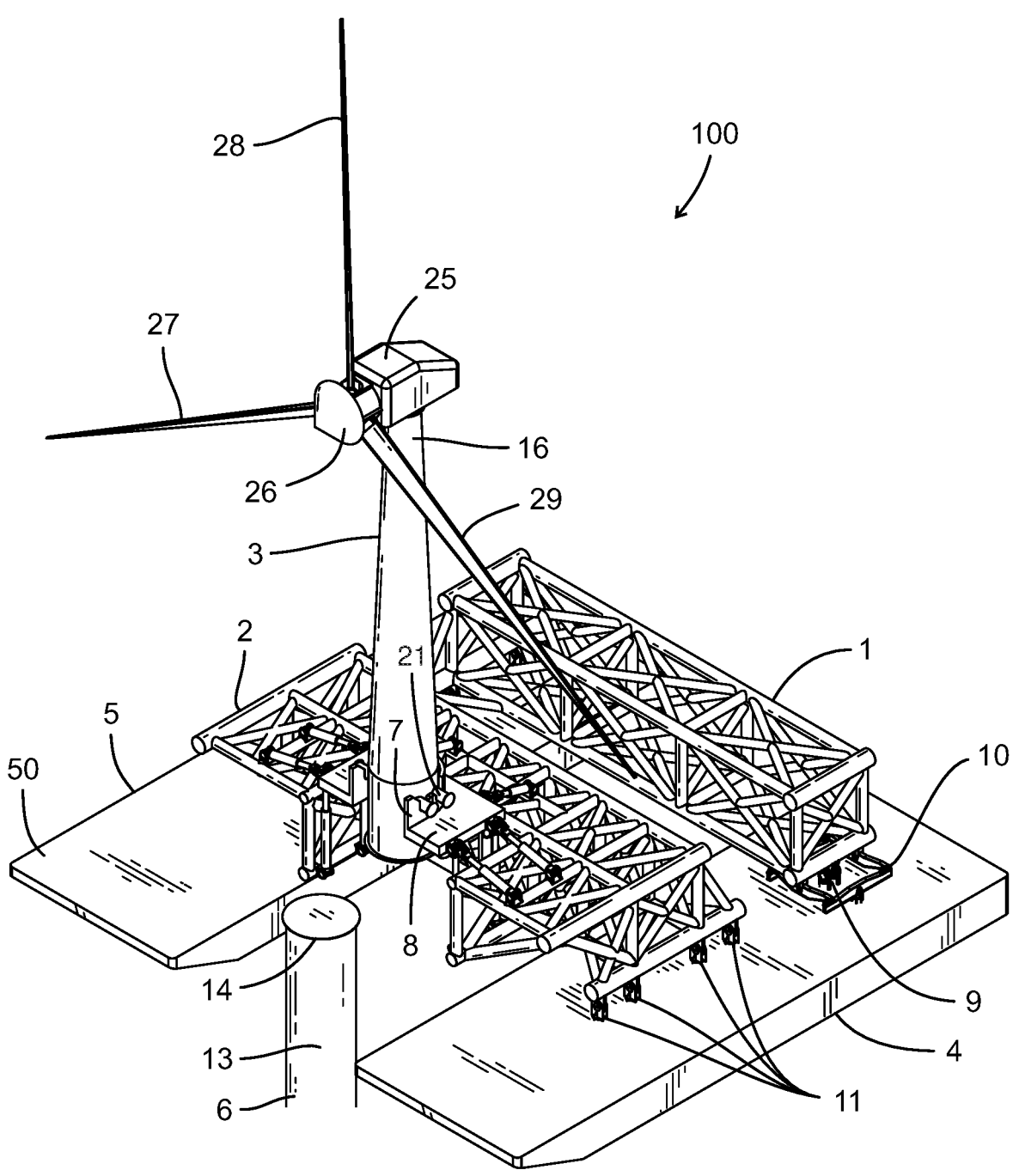
FIG. 1 is a perspective view of a preferred embodiment of the apparatus of the present invention.
Figure 2:
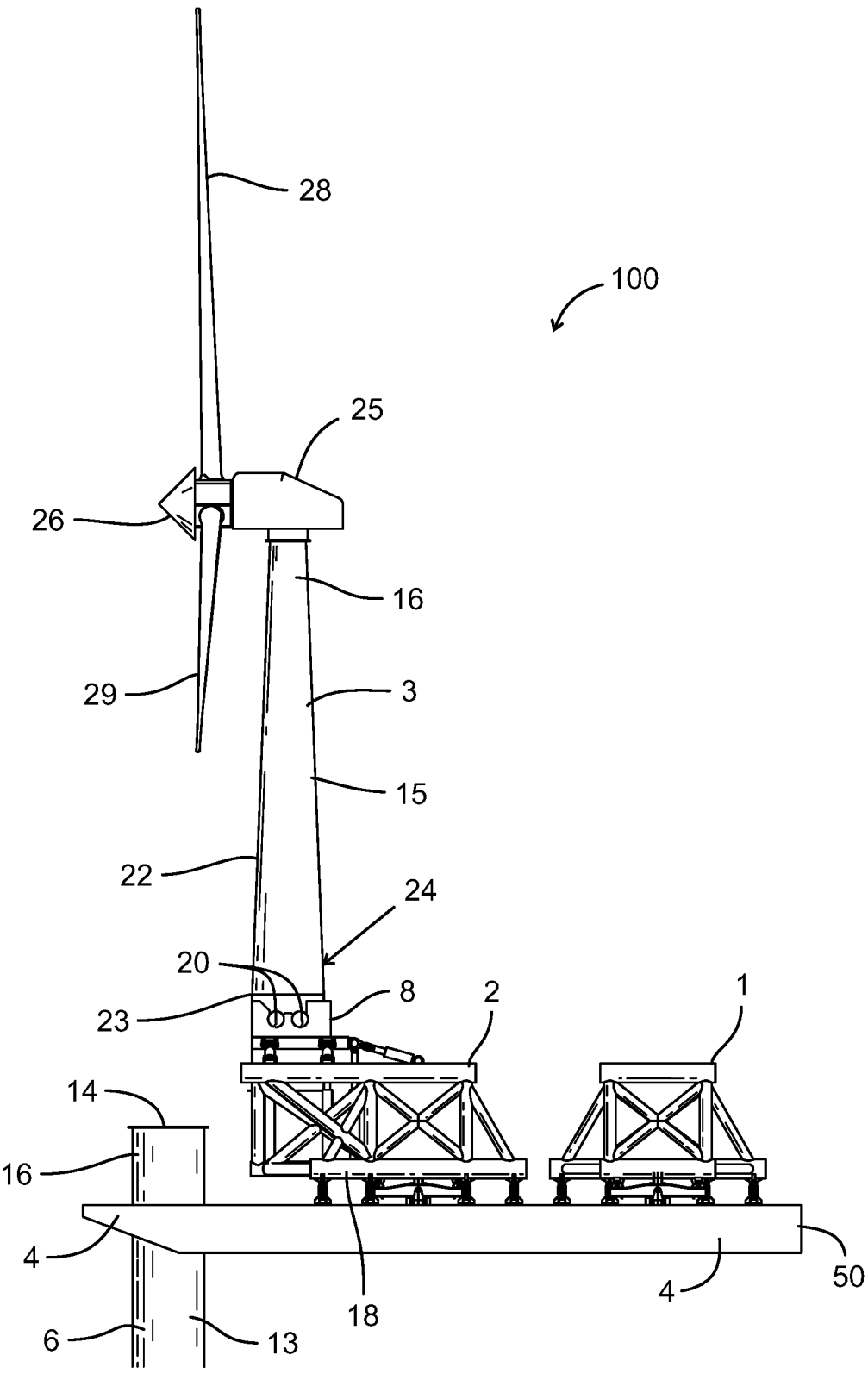
FIG. 2 is an elevation view of a preferred embodiment of the apparatus of the present invention.
Figure 3:
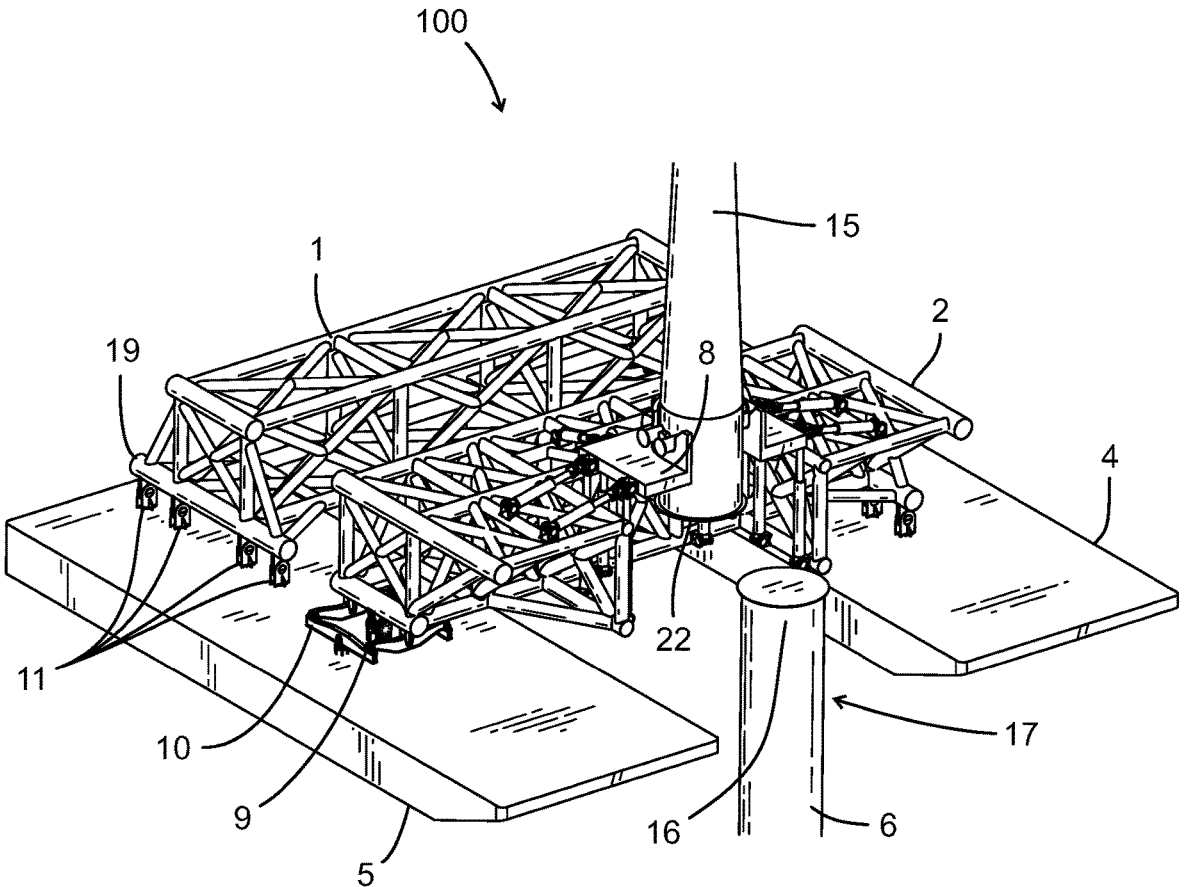
FIG. 3 is a partial perspective view of a preferred embodiment of the apparatus of the present invention.
Figure 4:
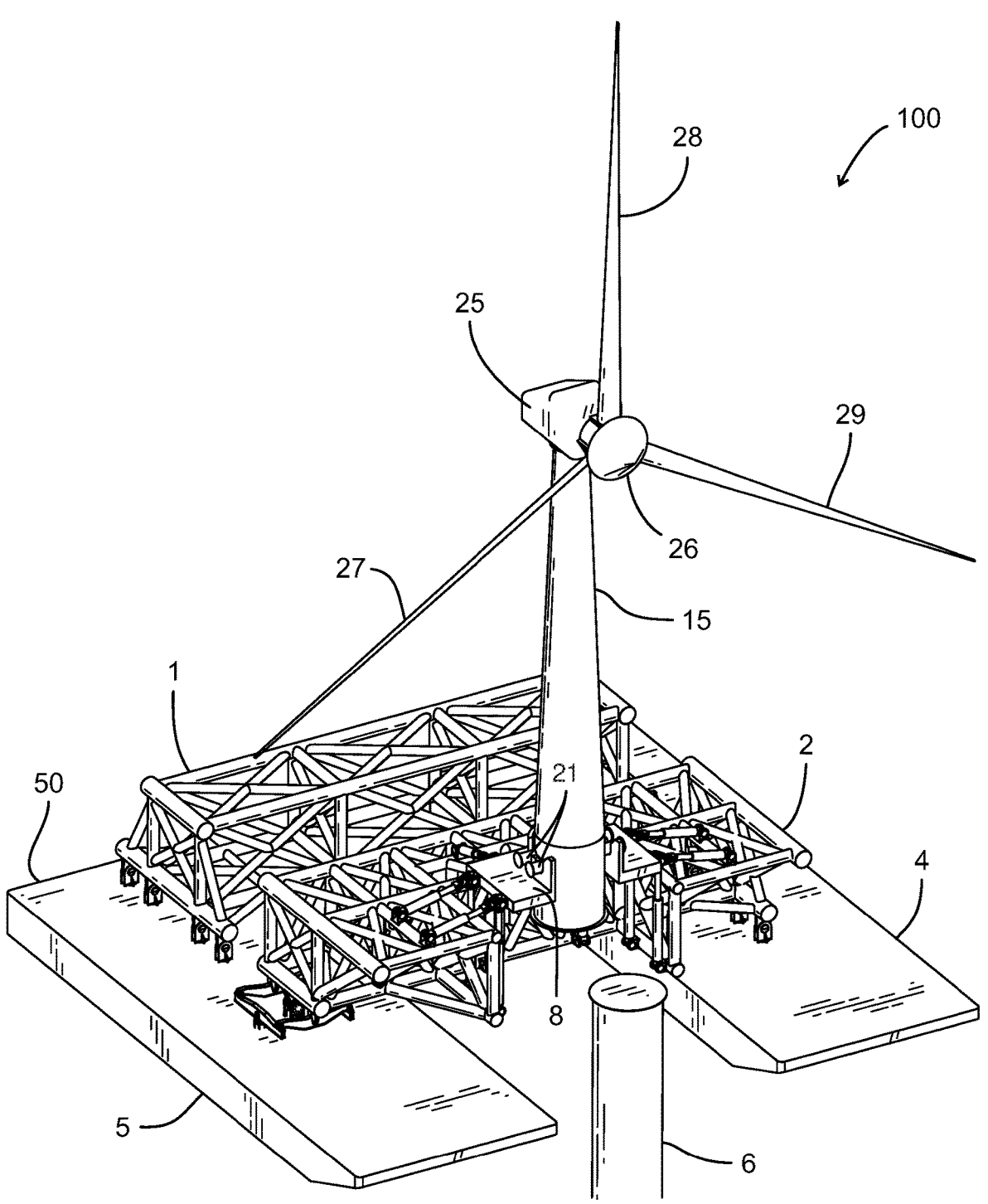
FIG. 4 is a perspective view of a preferred embodiment of the apparatus of the present invention.
Figure 5:
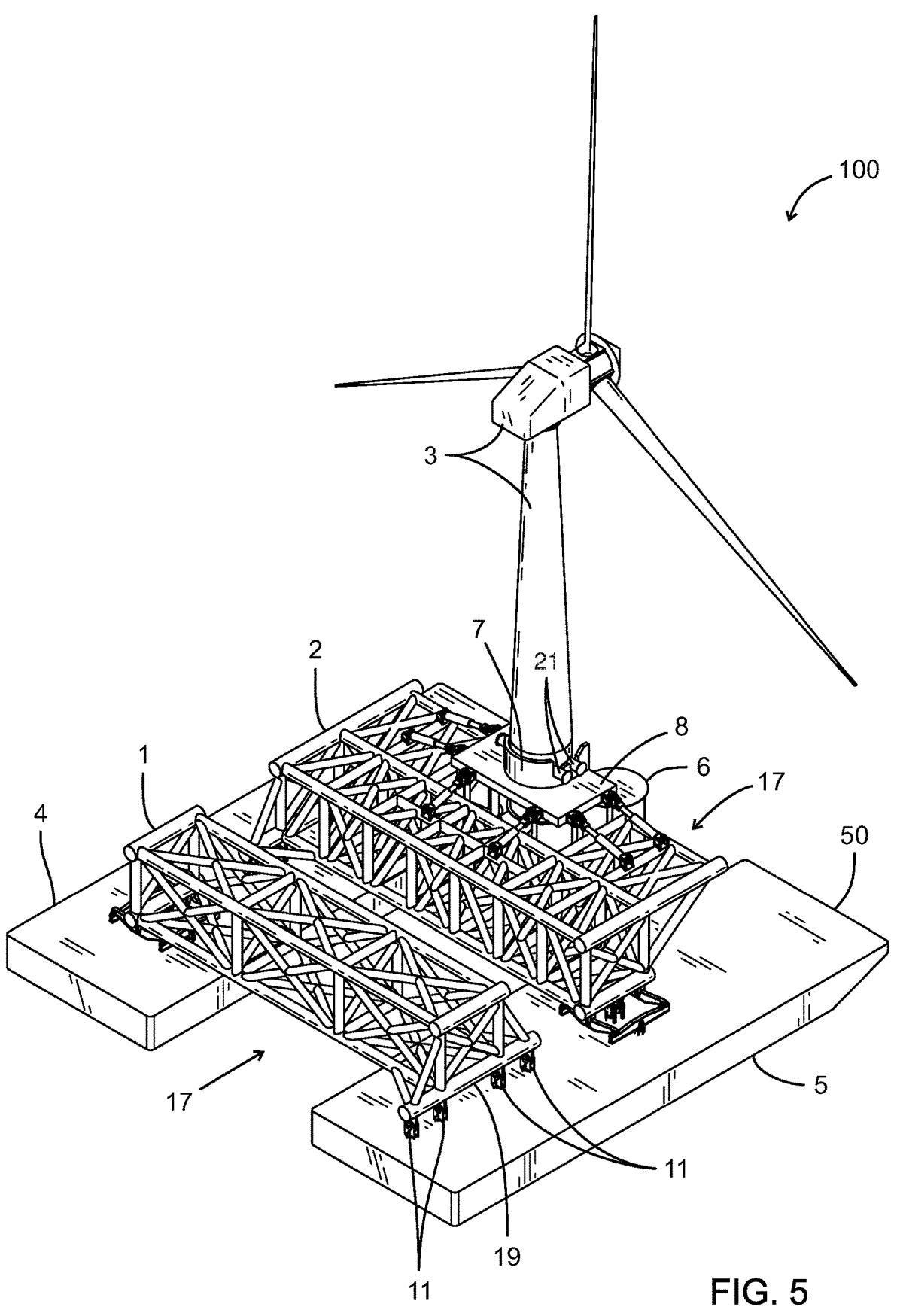
FIG. 5 is a rear perspective view of a preferred embodiment of the apparatus of the present invention.
Figure 6:
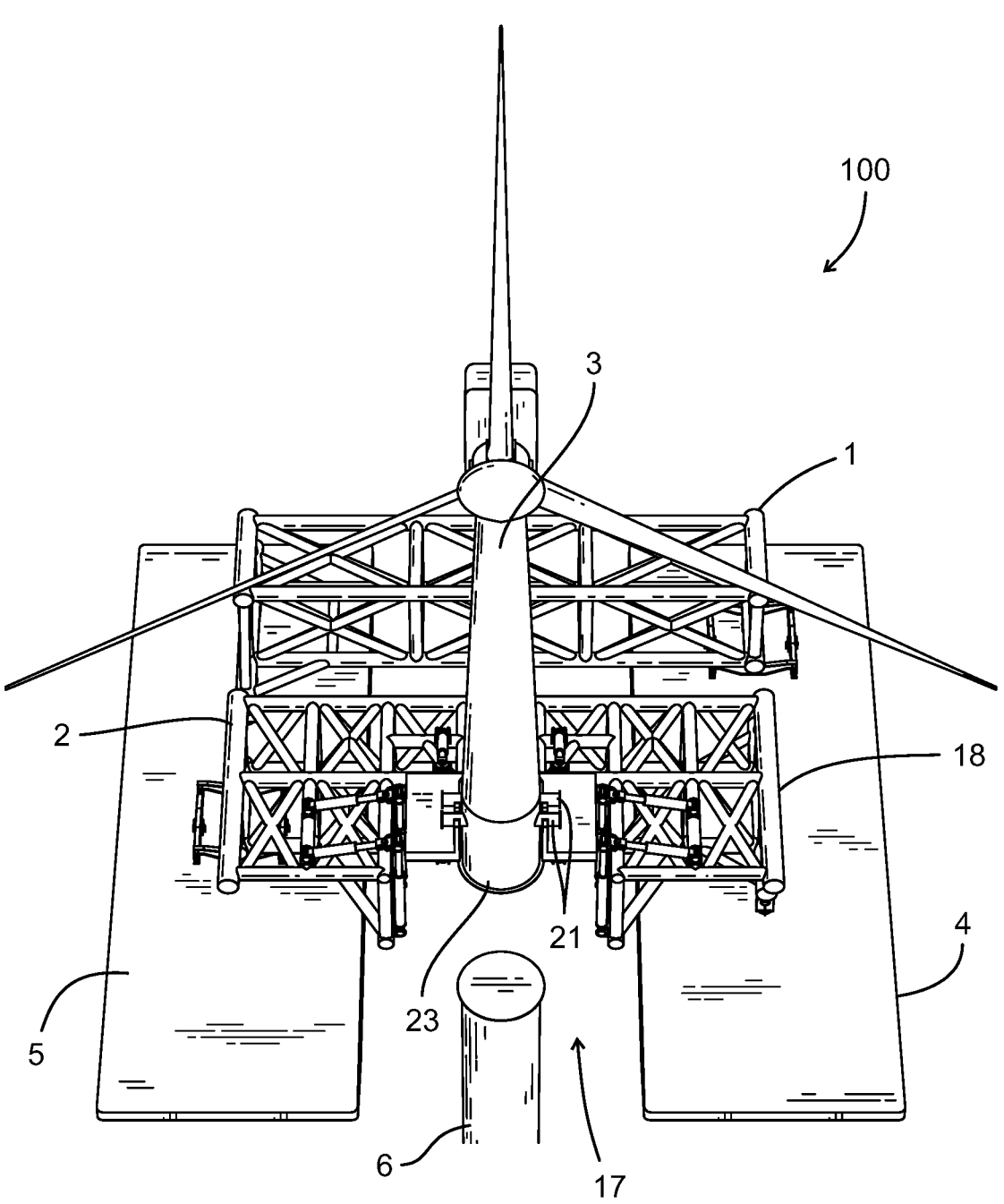
FIG. 6 is a front perspective view of a preferred embodiment of the apparatus of the present invention.
Figure 7:
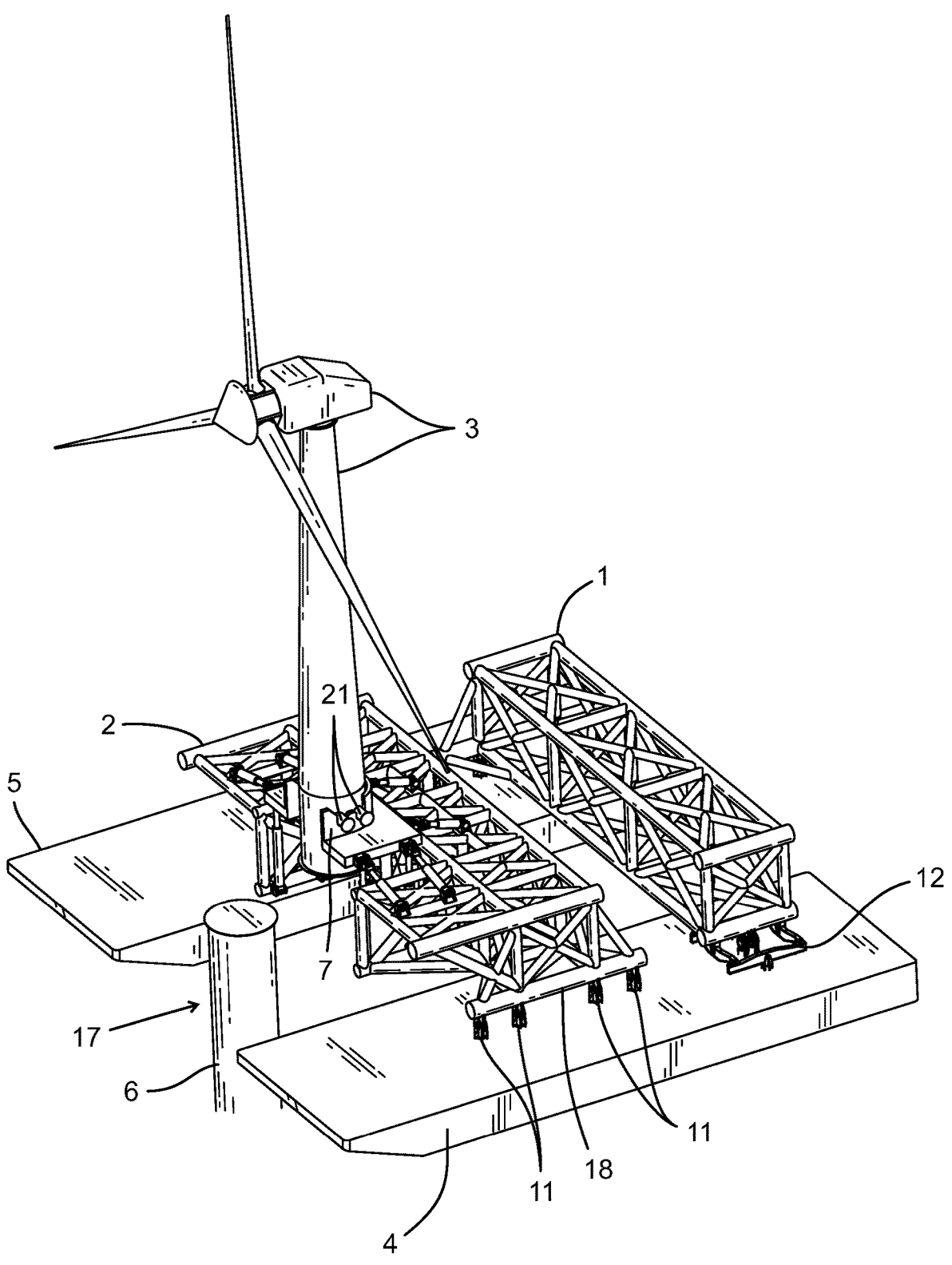
FIG. 7 is a perspective view of a preferred embodiment of the apparatus of the present invention.
Figure 8:
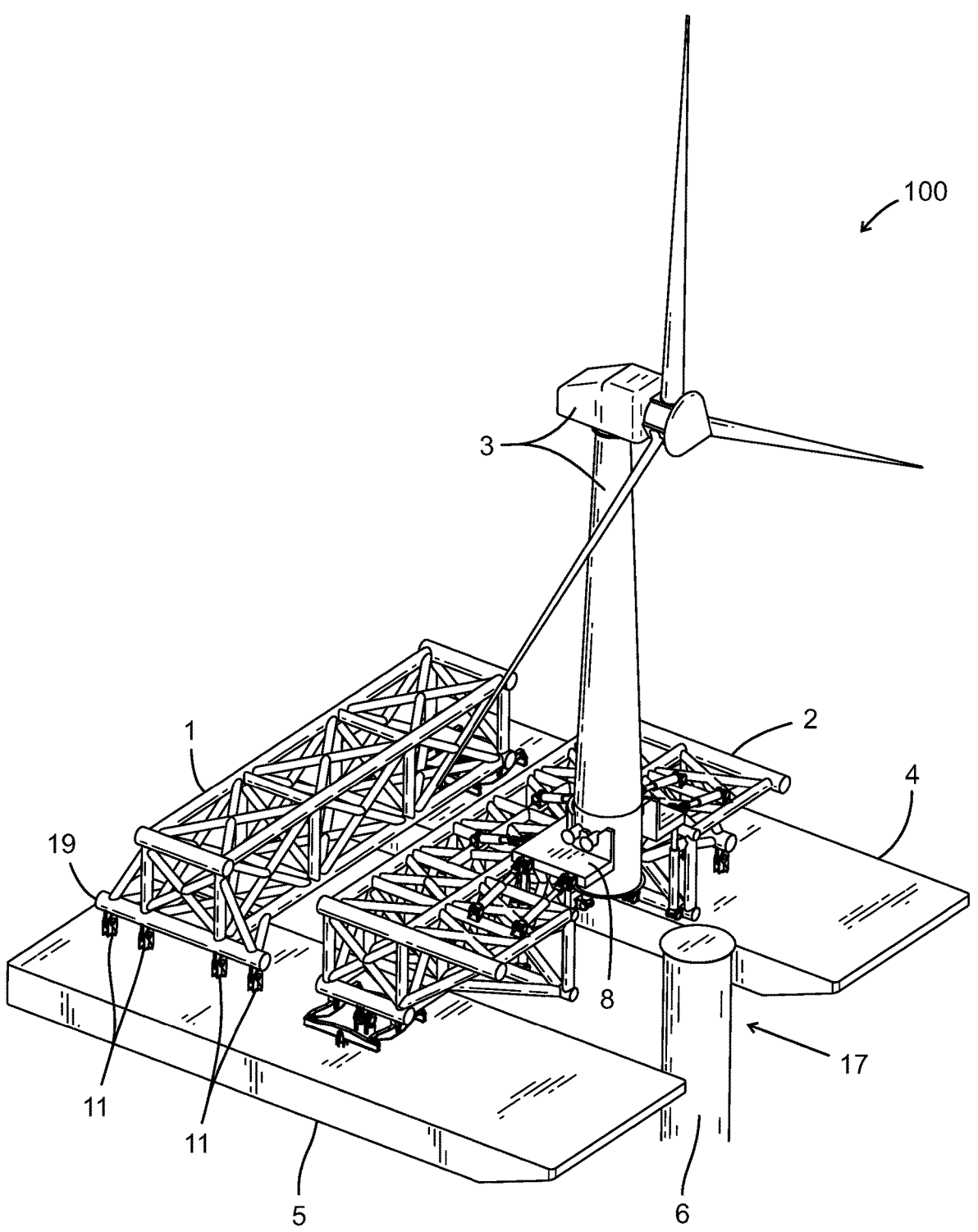
FIG. 8 is a perspective view of a preferred embodiment of the apparatus of the present invention.
Figure 9:
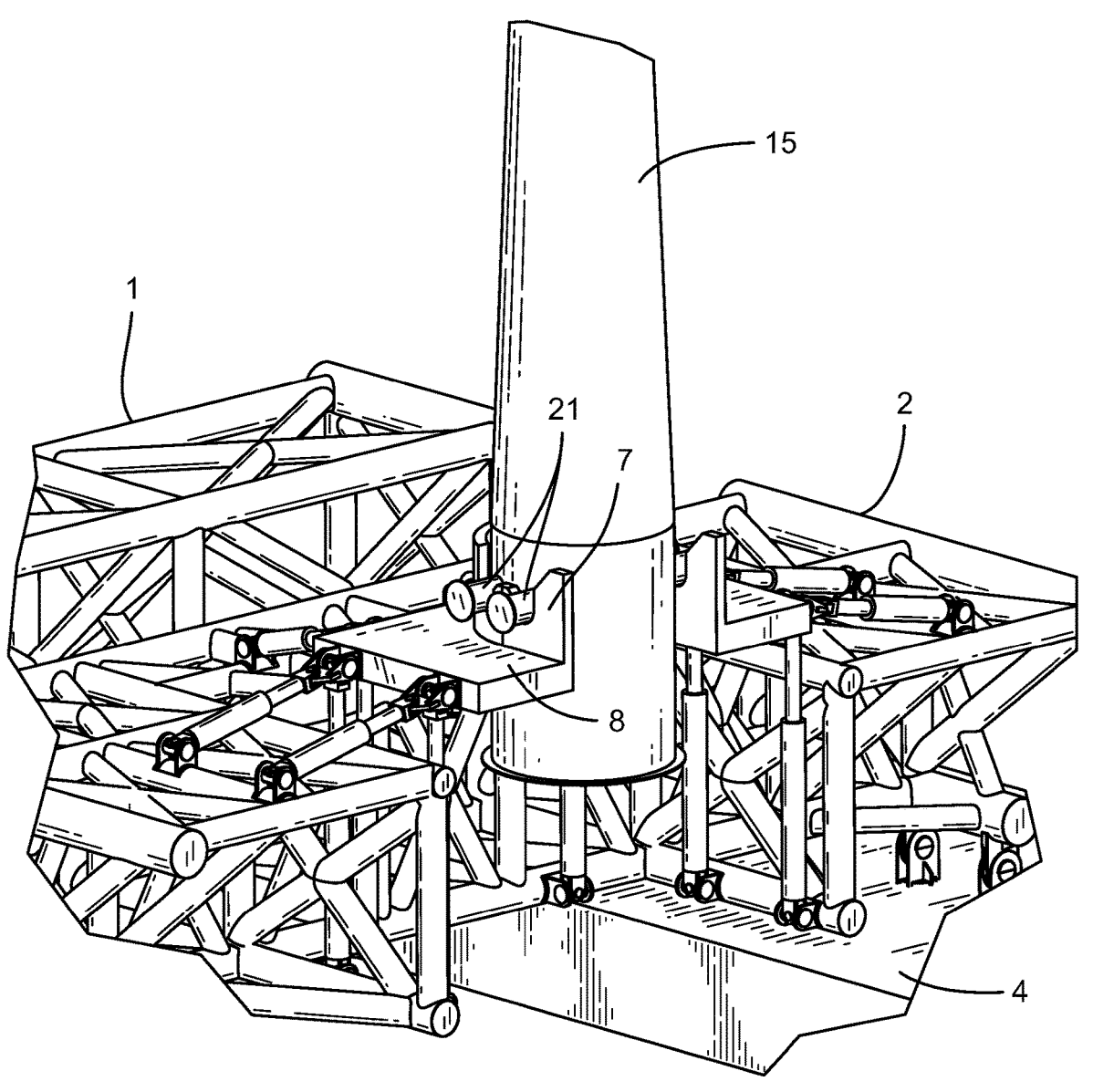
FIG. 9 is a fragmentary, partial perspective view of a preferred embodiment of the apparatus of the present invention.
Figure 10:
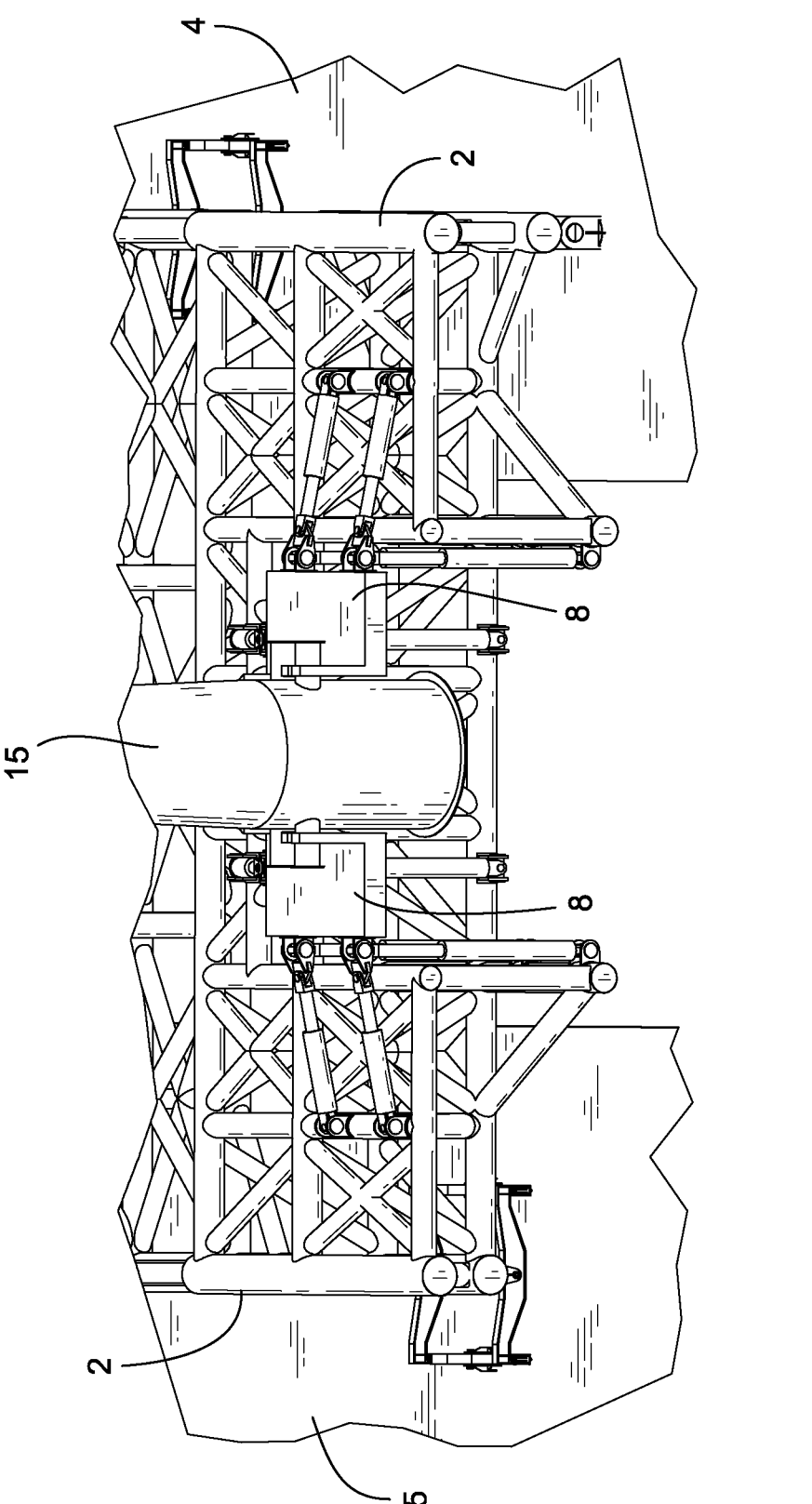
FIG. 10 is a fragmentary, partial perspective view of a preferred embodiment of the apparatus of the present invention.
Figure 11:
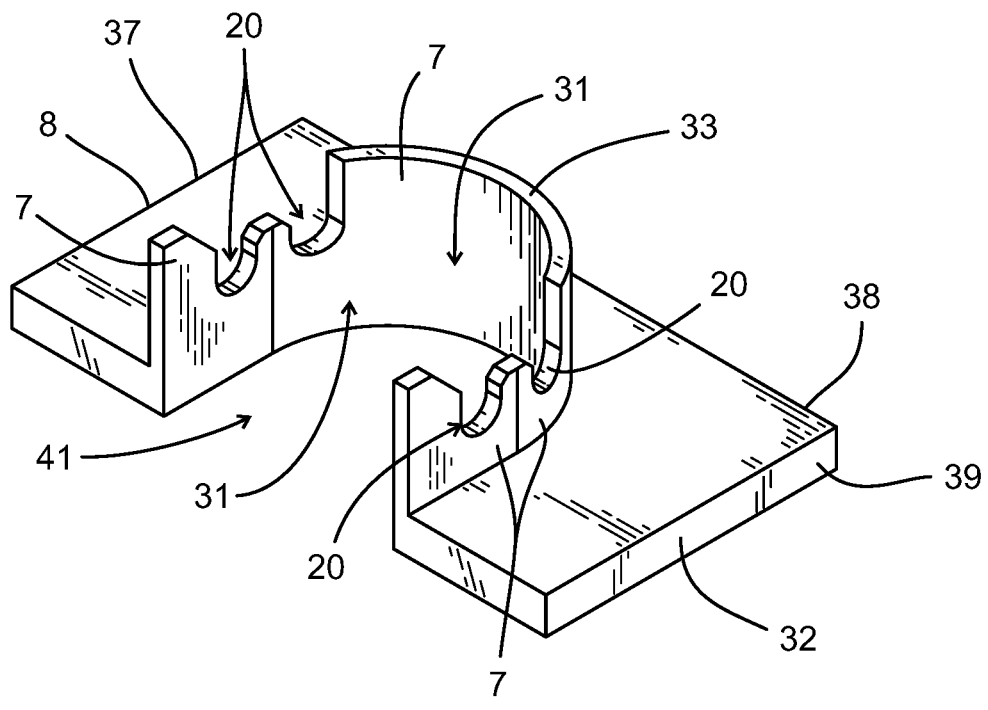
FIG. 11 is a fragmentary view of a preferred embodiment of the apparatus of the present invention showing the table.
Figure 12:
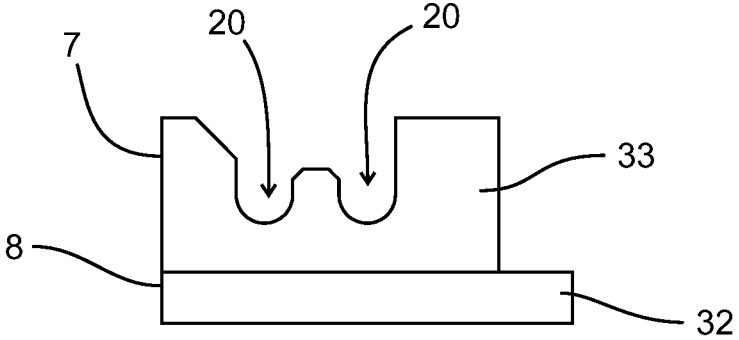
FIG. 12 is a fragmentary, side view of a preferred embodiment of the apparatus of the present invention showing the table.
Figure 13:
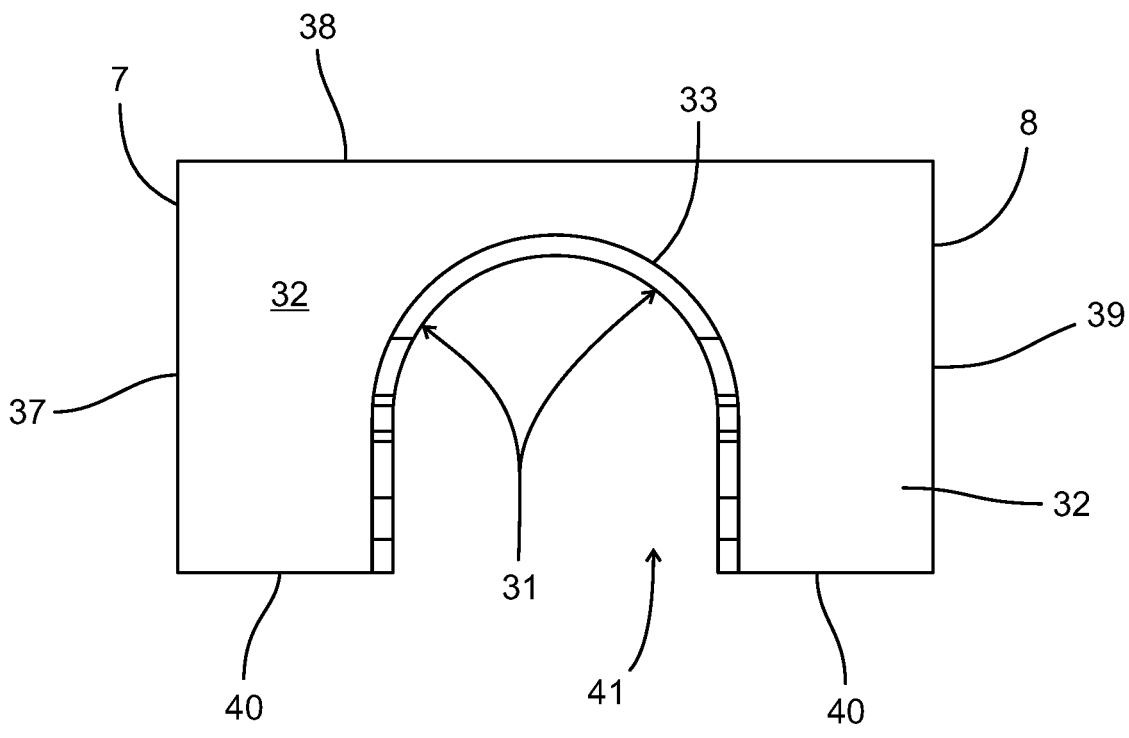
FIG. 13 is a fragmentary top view of a preferred embodiment of the apparatus of the present invention showing the table.
Figure 14:
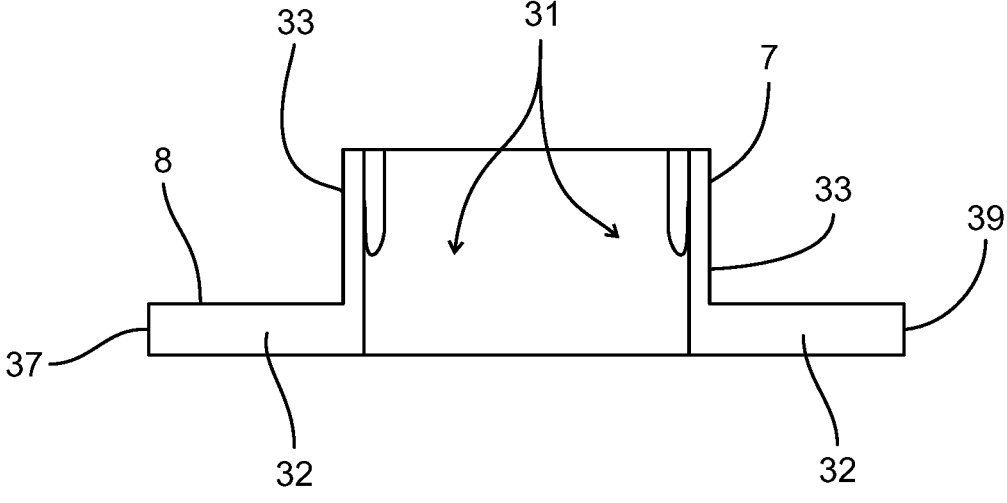
FIG. 14 is a fragmentary elevation view of a preferred embodiment of the apparatus of the present invention showing the table.

FIGS. 1-16 show a preferred embodiment of the apparatus of the present invention designated generally by the numeral 100. FIGS. 1-16 also show a preferred embodiment of the method of the present invention. In FIGS. 1-8 and 16, there can be seen a turbine foundation 6. Also shown in FIGS. 1-8 and 16 is a wind turbine 3 which can be a fully assembled wind turbine 3 preferably having column 15, column lower end or base portion 22, lower column edge 23, outer column surface 24, nacelle 25, hub 26 and blades 27, 28, 29. Such wind turbines 3 are known and commercially available from GE, Vestos, and Siemens. U.S. Pat. Nos. 7,220,104; 8,123,484; 10,161,387; and 11,353,006 show such wind turbines as 3 (each patent is hereby incorporated herein by reference).

Turbine foundation 6 can be anchored in a seabed. Foundation 6 can be a monopile (e.g., large diameter cylinder with a pile driven through it), a braced caisson, a traditional jacket type structure or concrete gravity structure. Foundation 6 preferably has upper end portion 16, outer surface 13 and upper edge 14. Catamaran 50 of apparatus 100 preferably places column 15 of turbine 3 on foundation 6 wherein lower edge 23 of column 15 registers upon upper edge 14 of foundation 6 (see FIG. 16) and is preferably connected thereto by a welded connection, grouted or bolted. For a grouted connection, a section of base 22 inserts into foundation 6 creating an overlap with an annulus which is subsequently grouted.

Catamaran device 50 has port hull 4, starboard hull 5 and a gap or space 17 therebetween. Bow gantry 2 spans from hull 4 to hull 5 as shown in FIGS. 1-8 and 16. Stem gantry 1 spans from port hull 4 to starboard hull 5 as shown in FIGS. 1-8 and 16.

Turbine support mechanism 7 (see FIG. 15) preferably has a frame or table 8 supported by multiple hydraulic rams 12, 30. Table 8 can have a curved surface 31 configured to conform to outer column surface 24 at column 15 lower end portion 22. The turbine support mechanism 7 can transmit the forces from the turbine base 22 by friction, the reaction against trunnions/lugs 21 located on the turbine base 22, or a combination of both.

Each gantry 1, 2 preferably has a horizontal member 18, 19 that interfaces with a hull 4 or 5 with multiple uniaxial pin joints 11. Stem gantry 1 has horizontal member 19 that interfaces or connects to starboard hull 5 with multiple (e.g., four) uniaxial pin joints 11. Bow gantry 2 has a horizontal member 18 that interfaces or connects to port hull 4 with multiple (e.g., four) uniaxial pin joints 11.

Each gantry 1, 2 connects to a hull 4 or 5 preferably with biaxial pin joint 9 and a redundant biaxial pin joint 10. Such biaxial pin joints 9 and biaxial pin joints 10 can be seen for example in U.S. Pat. Nos. 7,527,006 and 8,985,040, each of which is hereby incorporated herein by reference. Stem gantry 1 preferably connects to port hull 4 with biaxial pin joint 9 and redundant biaxial pin joint 10. Bow gantry 2 connects to starboard hull 5 with biaxial pin joint 9 and redundant biaxial pin joint 10. Each gantry 1, 2 can be in the form of a truss that includes the horizontal members 18, 19.

Figure 15:
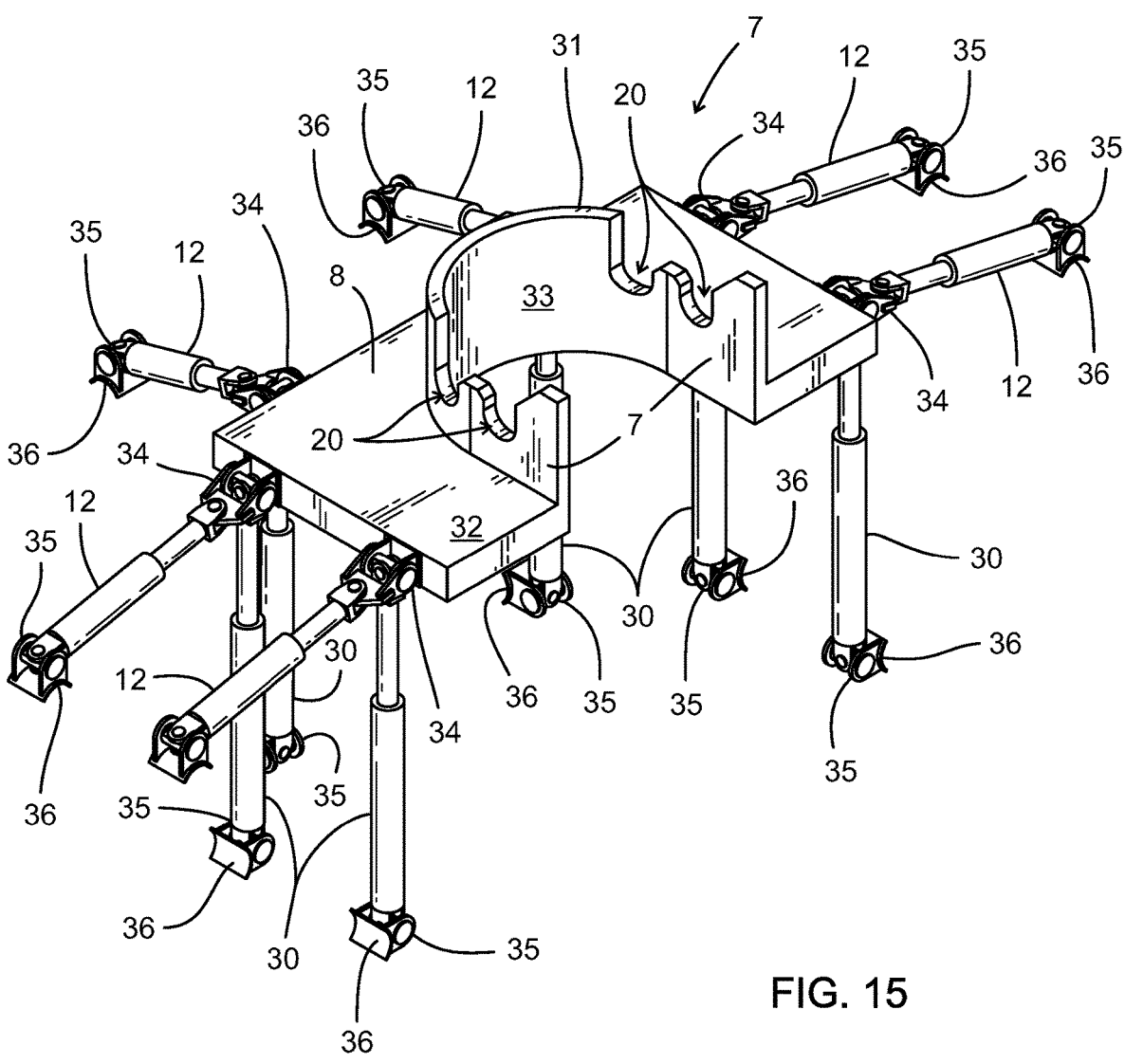
FIG. 15 is a fragmentary perspective view of a preferred embodiment of the apparatus of the present invention showing the table, laterally extending hydraulic rams and inclined hydraulic rams.
Figure 16:
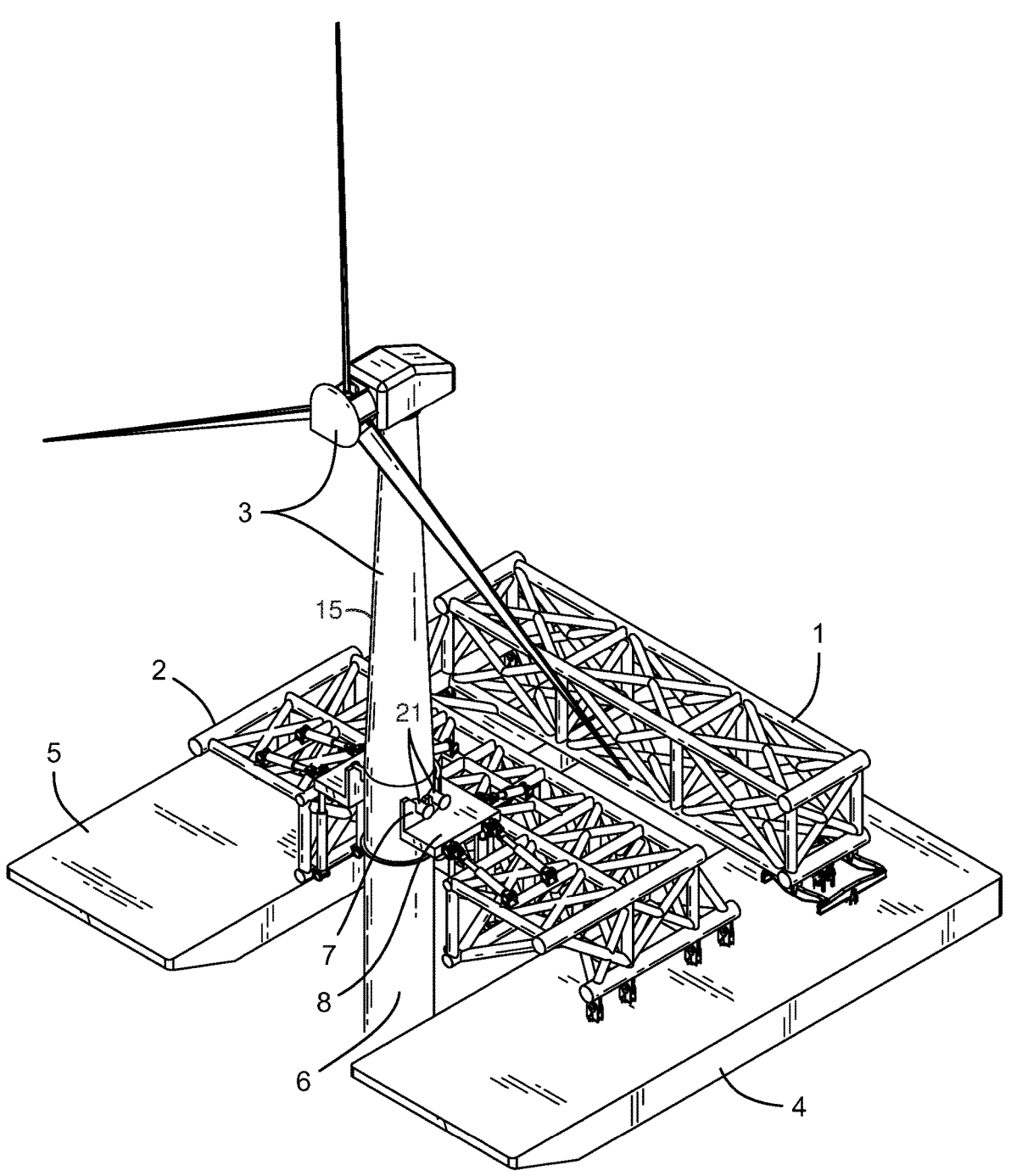
FIG. 16 is a perspective view of a preferred embodiment of the apparatus of the present invention showing the wind turbine installed on the turbine foundation.

Bow gantry 2 preferably has frame, support or table 8 that can be elevated or lowered using multiple hydraulic rams 12, 30 which can be lateral motion compensating hydraulic rams 12 and inclined motion compensating rams 30 (see FIG. 15). Table or support 8 preferably has recesses 20 that connect with trunnions/lugs 21 on lower end 22 of column 15.

In FIG. 15, the turbine support mechanism 7 preferably includes frame, support or table 8 and hydraulic jacks 12, 30. The hydraulic jacks can include laterally extending jacks 12 and inclined (e.g., vertically extending) jacks 30. The jacks 12, 30 can be motion compensated rams driven with dynamic fluid hydraulic power, meaning that they can extend and retract at speeds equal to motions of the catamaran installation vessel 50 in the marine environment. On location the installation vessel 50 will position itself such that the base 22 of the wind turbine column 15 is located generally vertically above the wind turbine foundation 6 (see FIG. 16).

Each hydraulic cylinder preferably has connectors 34, 35 that enable connection of each hydraulic ram 12, 30 to bow gantry 2 and to table 8. In FIG. 15, a connector 34 connects each ram 12, 30 to frame, support or table 8. In FIG. 15, a connector 35 connects each ram 12, 30 to bow gantry 2. Each connector 34, 35 can be a universal joint. Connectors 35 can be provided with curved or concave plates 36 configured to conform to the shape of truss members on the bow gantry 2 (e.g., see FIGS. 9-10 and 15). Connectors 34 can connect to table, support or frame 8 with welding or bolting. Table, frame or support 8 has sides or side walls 37, 38, 39, 40. Side 40 preferably communicates with open ended recess or slot 41. Table, frame or support 8 preferably has a horizontally extending section or plate section 32 and vertical or inclined wall 33. Wall 33 preferably has recesses 20 that enable engagement of wall 33 with trunnions/lugs 21 on wind turbine column 15 lower end portion or base 22.

The following is a list of parts and materials suitable for use in the present invention:

PARTS LIST

Part No. Description 1 stem gantry
2 bow gantry
3 wind turbine
4 port hull 5 starboard hull
6 turbine foundation
7 turbine support mechanism/gripper
8 turbine support table/frame/support
9 biaxial pin joint
10 redundant biaxial pin joint
11 uniaxial pin joint
12 rams/motion compensation hydraulic rams/laterally extending jacks
13 outer surface
14 upper edge
15 turbine column
16 upper end portion
17 gap/space
18 horizontal member
19 horizontal member
20 recess
21 lug/trunnions
22 lower end portion/base
23 lower edge
24 outer surface
25 nacelle
26 hub
27 blade
28 blade
29 blade
30 rams/motion compensating hydraulic rams/inclined jacks
31 curved surface
32 horizontal section/plate section
33 vertical/inclined wall
34 connector
35 connector
36 curved plate/concave plate
37 side/side wall
38 side/side wall
39 side/side wall
40 side/side wall
41 slot/open ended recess
50 catamaran device/catamaran installation vessel
100 catamaran floating offshore wind turbine transportation and installation vessel The foregoing embodiments are presented by way of example only; the scope of the present invention is to be limited only by the following claims:

The invention claimed is:

1. A method of installing a wind turbine on a foundation in a marine environment, comprising the steps of:

a) transporting the wind turbine from a first location to a second location with a floating installation vessel having two spaced apart hulls with a gap between the hulls, said turbine having a column and a column lower end portion;

b) positioning the wind turbine in the gap between the hulls in step "a";

c) spanning spaced apart bow and stern gantries from one hull to the other hull, the gantries including a first gantry and a second gantry;

d) wherein said second gantry is positioned next to the stern;

e) wherein said first gantry is spaced between the bow and stern;

f) said hulls and said first gantry defining an open area that is part of said gap and that is sized and shaped to receive the lower end portion of the wind turbine column;

g) moving the wind turbine foundation in relation to said hulls from a position in front of said bow into said open area by positioning said foundation toward said stern;

h) holding the lower end portion of the wind turbine column with a turbine support mechanism that includes a plate having an open ended recess that is occupied by the turbine column lower end portion;

i) selectively raising or lowering the plate with hydraulic rams that each connect to the plate and to the bow gantry;

j) aligning the turbine column lower end portion with the foundation;

k) forming a connection of the turbine column to the foundation; and l) wherein each of the gantries remain connected to the hulls and spacing the hulls apart in steps "d" through "k".

2. The method of claim 1 wherein the plate has a curved portion that corresponds in shape to the outer surface of the turbine column.

3. The method of claim 1 wherein the hydraulic rams include laterally extending rams and inclined rams.

4. The method of claim 1 wherein each said gantry is a truss.

5. The method of claim 1 wherein the first location is in a dock, port or shipyard.

6. The method of claim 1 wherein in step "a" the wind turbine is fully assembled at the first location.

7. The method of claim 1 wherein the turbine has blades and in step "d" the plate is positioned below the blades.

8. The method of claim 1 wherein one or more of the hydraulic rams are motion compensated hydraulic rams.

9. The method of claim 8 wherein the rams include rams that are oriented generally horizontally or laterally extending.

10. The method of claim 8 wherein the rams include rams that are oriented generally inclined or vertically extending.

11. The method of claim 1 wherein each gantry attaches to one hull with a pinned connection.

12. The method of claim 1 wherein the rams include vertically oriented rams and laterally or horizontally oriented rams.

13. The method of claim 1 further comprising compensation of relative motions between the foundation and the wind turbine.

14. The method of claim 1 further comprising reduction of relative motions between the foundation and the wind turbine.

15. A method of installing a wind turbine on a foundation in a marine environment, comprising the steps of:

a) transporting the wind turbine from a first location to a second location with a floating installation vessel having two spaced apart hulls with a gap between the hulls, said turbine having a column and a column lower end portion;

b) positioning the wind turbine in the gap between the hulls in step "a";

c) spanning spaced apart bow and stern gantries from one hull to the other hull, the gantries including a bow gantry and a stern gantry;

d) holding the lower end portion of the wind turbine column with a turbine support mechanism that includes a plate having an open ended recess that is occupied by the turbine column lower end portion;

e) selectively raising or lowering the plate with hydraulic rams that each connect to the plate and to the bow gantry;

f) aligning the turbine column lower end portion with the foundation;

g) forming a connection of the turbine column to the foundation; and h) wherein in step "d" there are trunnions on the turbine column and recesses on the plate that are configured to connect with the trunnions.

16. A wind turbine marine installation apparatus for installing a wind turbine on a foundation comprising:

a) a catamaran vessel having spaced apart hulls, a space between said hulls, vessel bow and stern end portions and a vessel central portion spaced in between said bow and stern end portions;

b) a first gantry that connects to each hull at said central portion;

c) a second gantry that connects to each hull next to the stern end portion;

d) a turbine support mechanism that is removably connectable to the turbine at a turbine base or lower end portion, said mechanism including a table having an open ended recess that is sized and shaped to receive the turbine base or lower end portion;

e) one or more hydraulic lifting devices that form an interface between the table and the first gantry;

f) extension and retraction of said hydraulic lifting devices enable selective positioning of said table relative to said foundation;

g) wherein each gantry forms a structural connection with each hull that maintains spacing of the hulls while enabling movement of each hull relative to the other hull responsive to wave action; and h) wherein said space includes an open portion in between said hulls and in between said bow end portions and said first gantry that enables movement of the foundation relative to the hulls from said bow toward said first gantry.

17. The wind turbine marine installation apparatus of claim 16 wherein the hydraulic lifting devices are hydraulic rams, each having a ram cylinder and an extendable/retractable pushrod.

18. The wind turbine marine installation apparatus of claim 16 wherein the table has three closed sides and one open side at said open ended recess.

19. The wind turbine marine installation apparatus of claim 16 wherein each hull has a bow and the first gantry is so positioned that the foundation can occupy said space aft of each said hull bow.

20. The wind turbine marine installation apparatus of claim 16 wherein the foundation has an upper edge and the upper edge is connectable with the wind turbine at a position in between the hulls and behind each hull bow.

21. A wind turbine marine installation apparatus for installing a wind turbine on a foundation comprising:

a) a catamaran vessel having spaced apart hulls and a space between said hulls;

b) a bow gantry that connects to each hull;

c) a stern gantry that connects to each hull;

d) a turbine support mechanism that is removably connectable to the turbine at a turbine base or lower end portion, said mechanism including a table having an open ended recess that is sized and shaped to receive the turbine base or lower end portion;

e) one or more hydraulic lifting devices that form an interface between the table and the bow gantry;

f) extension and retraction of said hydraulic lifting devices enable selective positioning of said table relative to said foundation;

g) wherein the table has three closed sides and one open side at said open ended recess; and h) wherein each hydraulic lifting device attaches to a table closed side.

22. A wind turbine marine installation apparatus for installing a wind turbine having a column and a base on a foundation comprising:

a) a catamaran vessel having spaced apart hulls and a space between said hulls, said vessel having bow and stern portions;

b) a first gantry that connects to each hull;

c) a second gantry that connects to each hull next to said stern portion;

d) a turbine support mechanism that is removably connectable to the turbine lower end portion, said mechanism including a frame having an open ended recess that is sized and shaped to receive the turbine base or lower end portion;

e) one or more hydraulic lifting devices that form an interface between the frame and the bow gantry;

f) extension and retraction of said hydraulic lifting devices enable selective positioning of said frame relative to said foundation;

g) wherein each gantry forms a structural connection with each hull that maintains spacing of the hulls while enabling movement of each hull relative to the other hull responsive to wave action; and h) wherein said space includes a forward open bow end portion enabling relative movement of the foundation and hulls and alignment of the turbine end portion with the foundation via the open bow end portion.

\* \* \* \* \*